(12) United States Patent
Sawada et al.

(10) Patent No.: US 6,285,107 B1
(45) Date of Patent: Sep. 4, 2001

(54) STATOR STRUCTURE OF MOTOR

(75) Inventors: Kiyoshi Sawada, Shizuoka; Tomohiko Kawai, Yamanashi, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/564,684

(22) Filed: May 4, 2000

(30) Foreign Application Priority Data

May 17, 1999 (JP) .................................................. 11-136118

(51) Int. Cl.⁷ ...................................................... H02K 1/12
(52) U.S. Cl. ........................... 310/254; 310/258; 310/259; 310/194; 310/179; 310/164; 310/67 R
(58) Field of Search .................... 310/254, 259, 310/179, 194, 164, 258, 67 R (56) References Cited

U.S. PATENT DOCUMENTS

| | | |
|---|---|---|
| 4,547,713 | 10/1985 | Langley et al. . |
| 4,604,665 | 8/1986 | Müller et al. . |
| 4,866,572 * | 9/1989 | Bernstein ............................... 361/400 |
| 4,992,688 * | 2/1991 | Cap et al. ............................... 310/71 |
| 5,305,163 * | 4/1994 | Holm ................................. 360/98.01 |
| 5,764,442 * | 6/1998 | Komatsu et al. ..................... 360/107 |
| 5,997,267 | 12/1999 | Lee . |
| 6,133,667 * | 10/2000 | Sawada et al. ....................... 310/259 |

FOREIGN PATENT DOCUMENTS

| | | | |
|---|---|---|---|
| 297 05 843 U | 7/1997 | (DE) | .............................. H02K/11/02 |
| 60-103264 | 7/1985 | (JP) . | |
| 5-191056 | 7/1993 | (JP) . | |

* cited by examiner

Primary Examiner—Nestor Ramirez
Assistant Examiner—Thanh Lam
(74) Attorney, Agent, or Firm—Staas & Halsey, LLP (57) ABSTRACT

A stator structure for a motor of high precision by suppressing influence of electromagnetic noise between windings and a distribution pattern layer in a printed board. A shield is provided between the windings and the distribution pattern layer of the printed board to shield the electromagnetic noise and suppress the influence of the electromagnetic noise to thereby enable precise control of the motor. A multilayered printed board is arranged on an axial end face of the stator core and the windings are formed around the stator core and the multilayered printed board to enfold them toroidally in a regular winding manner. The multilayered printed board comprises a distribution pattern layer for connection with the windings and a shield layer for shielding electromagnetism between the distribution pattern layer and the windings.

9 Claims, 7 Drawing Sheets

-V PHASE DISTRIBUTED
WINDING
20 COLUMNS × 1 ROW
20 TURNS

-V PHASE DISTRIBUTED
WINDING
20 COLUMNS × 2 ROWS
40 TURNS

-V PHASE DISTRIBUTED
WINDING
20 COLUMNS × 1 ROW
20 TURNS

STATOR STRUCTURE OF MOTOR

BACKGROUND OF THE INVENTION

1. Field of the Invention

The present invention relates to a stator structure of an electric motor and in particular to a structure of a stator with a slot-less core.

2. Description of the Related Art

In various precision instruments such as optical instruments, electronic instruments and the like, components need to have machining precision in the order of nanometer to meet demands for high precision, high density and high integration. Machine tools, steppers and electron beam delineation devices for machining those components with high precision are required to have resolution of extremely high precision. In those machining and manufacturing devices, positioning is performed by a positioning device, and the position control by the positioning device is performed generally with a rotary servomotor or a linear motor which is controlled by a CNC. Thus, in order to improve the machining precision of components, it is necessary to control the rotary servomotor or the linear motor with high precision, so that electric current for such precise control is rendered very small. Therefore, even minute electromagnetic noise may influence the electric current for the precise control greatly.

In general, the rotary servomotor or the linear motor has torque ripple which is a significant factor in precision of the motor, and efforts to improve precision of the motor have been made by reducing the torque ripple.

Torque ripple can be broadly classified into machine-structural torque ripple and electromagnetic torque ripple. For example, in the rotary servomotor, frictional resistance acting on bearings for a rotor shaft causes the machine-structural torque ripple, and magnetic distortion produced between a rotor and a stator causes the electromagnetic torque ripple.

In order to reduce the machine-structural torque ripple, it has been proposed to support a shaft in a non-contact manner with a pneumatic bearing or a magnetic bearing to thereby reduce the frictional resistance. In addition, a stator of slot-less structure is proposed for suppressing cogging torque due to slots formed in a stator core in order to reduce the electromagnetic torque ripple. In view that a position precision and a manner of winding are important factors in deciding electromagnetic action in the slot-less stator core, it has been proposed to form windings in a toroidal shape and in a regular winding manner so to secure position precision of the windings in U.S. patent application Ser. No. 09/327,471 by inventors of the present invention.

Figure 10:
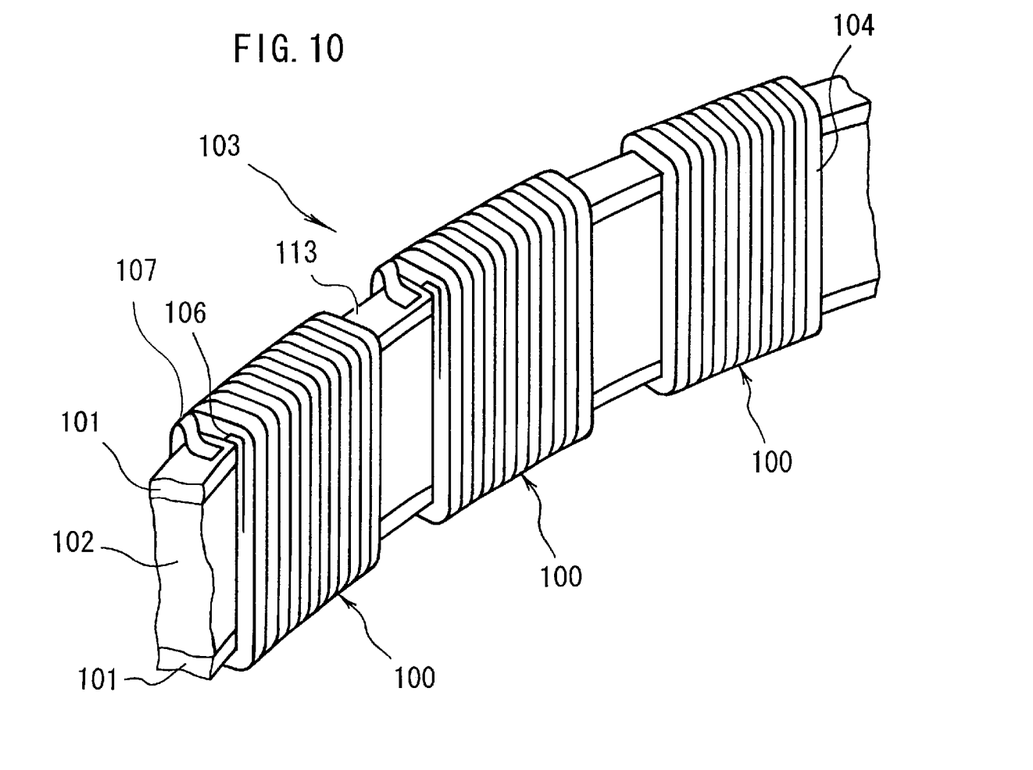
FIG. 10 is a partially perspective view of a stator having toroidal windings.

Such a stator structure with toroidal windings is shown in FIG. 10. In FIG. 10, winding segments 100 are arranged at appropriate positions with appropriate intervals therebetween on an annular stator core 102 according to a type of the motor and the number of poles. A printed board 101 is arranged on both sides of the stator core 102 and a wire 104 is wound around the printed board 101 and the stator core 102 in a regular winding manner to form the winding segment 100.

A distribution pattern layer 113 is arranged at an outermost portion of the printed board 101 and a winding start point 106 and a winding end point 107 of the wire 104 are connected to the distribution pattern layer 113 to constitute an electric circuit including the wire 104 of each winding segment 100. This structure reduces so-called lugs of winding which are part of the winding projecting from the stator core in an axial direction of the motor and electromagnetically not contributing to rotational force of the rotor, and also enables to design a compact motor. Further, since the toroidal windings formed in the regular winding manner tie up the stator core and the printed board, the strong structure of reducing peel-off or slip-off of the winding is obtained. Furthermore, since an edge of the stator core which exerts bending stress to the winding and causes damage to coating of the winding is insulated by the printed board, the winding is prevented from being grounded through the stator core. In addition, the damage of the wire of the winding can be prevented by setting radius of curvature of the edges of the printed board to be relatively large.

Since the windings are formed very close to the printed board in this stator structure where the windings are formed on the printed board arranged on the stator core, the electromagnetic noise caused by electric current flowing in the distribution pattern layer gives undesirable influence on the current flowing in the windings and vise versa by the interactive electromagnetism.

Figure 11:
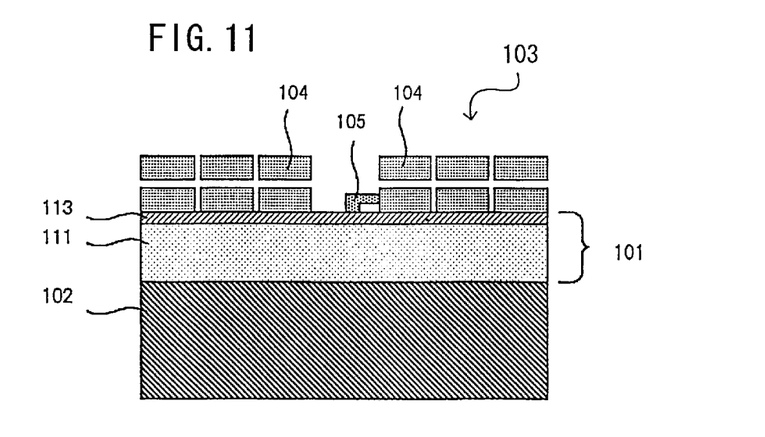
FIG. 11 is a partially sectional view of the stator as shown in FIG. 10.

FIG. 11 is a partially sectional view of the stator 103. As shown in FIG. 11, the stator core 102, the printed board 101 and the windings 104 are successively laminated to form the stator 103. The printed board 101 has the distribution pattern layer 113 arranged on a resin layer 111, which is connected to the winding 104 via a connecting element 105.

Exciting current flows in each phase (U, V, and W phases) of the winding 104 through the distribution pattern layer 113 according to the exciting control and the electromagnetic nose is produced in the winding 104 and the distribution pattern layer 113. Since the winding 104 and the distribution pattern layer 113 are arranged adjacent to each other, the produced noise influences the current flowing in these elements. As stated above, since the electric current for precise control of the motor is very minute, even very minute electromagnetic noise between the distribution pattern layer and the windings may influence the electric current control greatly.

SUMMARY OF THE INVENTION

An object of the present invention is to provide a stator structure applicable to a motor requiring high precision control by suppressing influence of electromagnetic noise between windings and a distribution pattern layer in a printed board.

The stator structure of the present invention provides a shield for shielding the electromagnetic noise between the windings and the distribution pattern layer of the printed board so as to suppress interactive influence of the electromagnetic noise.

According to one aspect of the present invention, a multilayered printed board is arranged on an axial end face of a stator core, windings are formed around the stator core and the multilayered printed board toroidally in a regular winding manner to enfold them, and the multilayered printed board includes a distribution pattern layer to interconnect the windings, and a shield to shield electromagnetism between the distribution pattern layer and the windings in a region enfolded by the windings.

The shield suppress influence of electromagnetism produced by electric current flowing in the distribution pattern layer upon the windings and influence of the electromagnetism produced by electric current flowing in the windings upon the distribution pattern layer, to thereby reduce the electromagnetic noise in these current flowing in the windings and the distribution pattern layer.

According to another aspect of the present invention, a first multilayered printed board is arranged on an axial end face of a stator core, first windings are formed around the stator core and the first multilayered printed board toroidally in a regular winding manner, a second multilayered printed board is arranged on an outermost surface of the first windings, second windings are formed around the stator core, the first multilayered printed board and the first windings toroidally in a regular winding manner, the first multilayered printed board has a first distribution pattern layer to interconnect the first windings and a first shield to shield electromagnetism between the first distribution pattern layer and the first windings, and the second multilayered printed board has a second distribution pattern layer to interconnect the second windings and a second shield to shield electromagnetism among the second distribution pattern layer, the first windings and the second windings.

The second multilayered printed board may have a third distribution pattern layer to interconnect the first windings, and a third shield to shield electromagnetism between the third distribution pattern layer and the first windings.

The influence of the electromagnetic noise between the distribution patten layer and the windings and between the distribution pattern layers is suppressed by these shield to enable high precise control of the motor.

The shield may include two shield layers arranged with the distribution pattern layer therebetween in an axial direction of the motor. With this arrangement, electromagnetism produced by electric current flowing in the distribution pattern layer does not influence the electric current flowing in the windings or the other distribution pattern layer arranged outside the shield layers, and also electromagnetism produced by electric current flowing in the windings or the other distribution pattern layer outside the shield layers does not influence the electric current flowing in the distribution pattern layer.

The shield may include a side shield covering a radial periphery of the multilayered printed board. The electromagnetism produced by electric current flowing in the distribution pattern layer to extend through radial peripheries of the printed board is shielded by the side shield and does not influence the electric current flowing in the windings.

In the case where the distribution pattern layer comprises a plurality of distribution blocks, an additional shield for shielding electromagnetism among the distribution blocks may be provided at abutment between adjacent distribution blocks.

DETAILED DESCRIPTION OF THE PREFERRED EMBODIMENTS

A stator structure according to a first embodiment of the present invention will be described referring to FIGS. 1 through 3.

Figure 1:
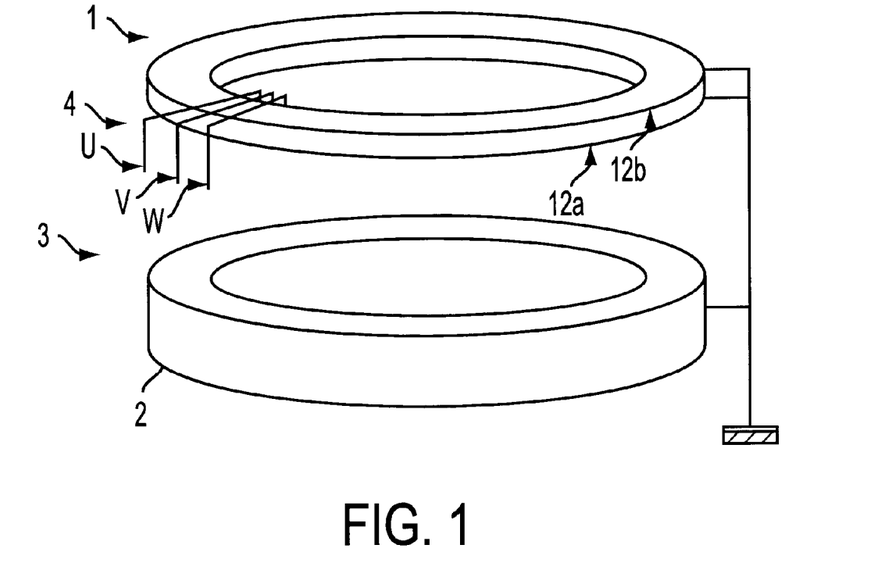
FIG. 1 is an exploded view of a stator according to an embodiment of the present invention.

As shown in FIG. 1, a stator 3 comprises a multilayered printed board 1, a slot-less stator core 2 having a shape of a toroid or a short cylindrical tube, and windings 4. The windings 4 are formed around the multilayered printed board 1 and the stator core 2 to enfold them toridally in a manner of regular winding. In FIG. 1, only a part of the windings 4 of U-phase, V-phase and W-phase are shown.

In forming the toroidal winding 4 by helically winding a wire around the stator core 2 and the multilayered printed board 1, the direction in which the winding 4 is being formed is along an annular line. The winding action is performed so that the wound wire does not form a crossing portion in each layer being formed by the winding action, thereby, positional precision of the winding 4 is made high in a direction tangent to the surface of the stator core 2.

In a regular winding, the winding 4 is formed layer by layer and each layer is laid one on another, thereby positioning precision of the winding 4 is made high in a direction of a normal line of the surface of the stator core 2. By improving the positional precision of each winding, the thickness of the whole winding 4 is made uniform.

Thus, by winding a wire around the slot-less stator core 2 to form a toroidal shape in a manner of the regular winding, the formed winding 4 has high positional precision in both tangential direction and normal direction of the surface of the stator core 2. Also, electrical resistance and inductance of windings 4 can be made uniform by forming the windings with high positional precision, to produce uniform magnetic field.

The multilayered printed board 1 is adhered to one axial end face of the stator core 2 or both axial end faces of the stator core 2 to be united with each other, and then the windings 4 are formed around the multilayered printed board 1 and the stator core 2 united with each other.

Each phase of the winding segments which have the number corresponding to the number of the poles, are electrically interconnected through a distribution pattern formed in the multilayered printed board 1. The multilayered printed board 1 comprises shield layers 12a and 12b made of electromagnetic shield material, which are grounded together with the stator core 2.

Figure 2:
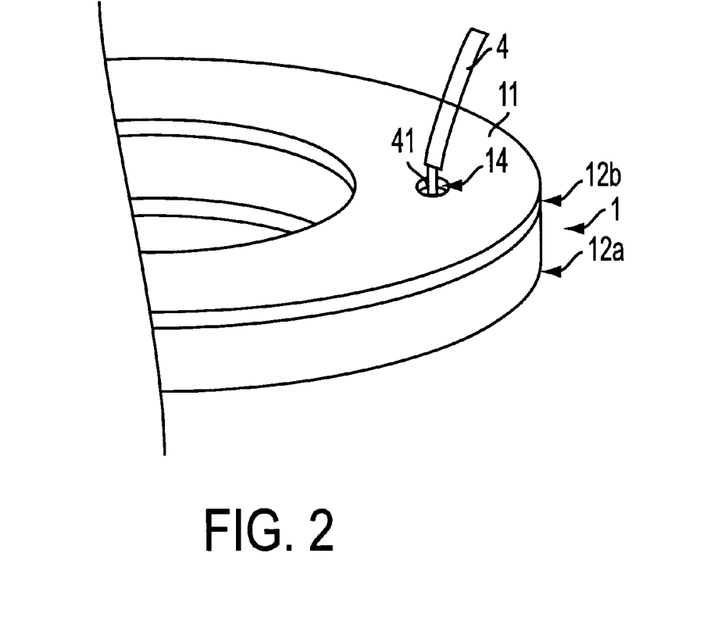
FIG. 2 is a partially perspective view of a printed board of the stator as shown in FIG. 1.
Figure 3:
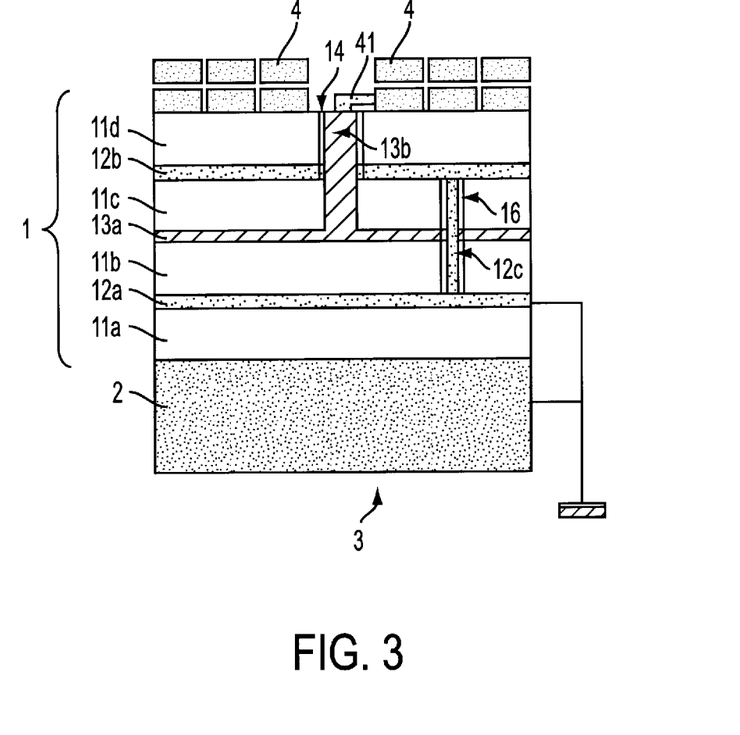
FIG. 3 is a partially sectional view of the stator as shown in FIG. 1.

FIG. 2 is a partially enlarged perspective view of the multilayered printed board 1 with a resin layer 11 and the shield layers 12a, 12b, and FIG. 3 is a partially sectional view of the multilayered printed board 1.

As shown in FIG. 3, the multilayered printed board 1 comprises a resin layer 11a, a shield layer 12a, a resin layer 11b, a distribution pattern layer 13a, a resin layer 11c, a shield layer 12b and a resin layer 11d laminated successively and the windings 4 are formed on the outermost resin layer 11d. With the above multilayered structure, the distribution pattern layer 13a is arranged between the shield layer 12a and the shield layer 12b.

The distribution pattern layer 13a includes distribution lines for interconnecting windings 4 of respective phases through a connecting member 41 and a connecting pattern 13b. The connecting pattern 13b has one end connected to the distribution pattern layer 13a and the other end exposed to an opening 14 of the resin layer 11d through a through hole 15 pierced through the resin layer 11c, the shield layer 12b and the resin layer 11d. The connection member 41 connects the connecting pattern 13b with the winding 4. The wires of the windings 4 may be sealed wires for preventing invasion and exudation of electromagnetic noise.

The shield layer 12a and the shield layer 12b are disposed with the distribution pattern layer 13a therebetween and connected with each other through a connection pattern 12c arranged in a through hole 16 pierced through the resin layers 11b, 11c and the distribution pattern layer 13a, to be connected to the ground together with the stator core 2. With this arrangement, the shield layers 12a and 12b prevent mutual invasion and exudation of electromagnetic noise between the distribution pattern layer 13a and the windings 4.

The electrical connection between the shield layer 12a and the stator core 2 can be established by a through hole formed in the resin layer 11a inside the stator 3 for using a single lead line for grounding to simplify the distribution.

Another embodiment of the stator structure of the present invention will be described referring to FIGS. 4 and 5.

Figure 4:
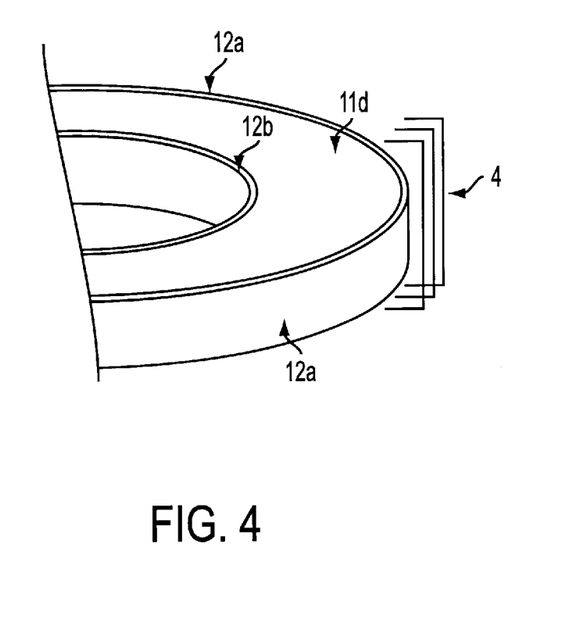
FIG. 4 is a partially perspective view of the stator having side shields.

FIG. 4 shows a stator structure for providing electromagnetic shield in the radial direction of the stator. It is necessary to take invasion and exudation of the electromagnetic noise in the radial direction of the stator into account in forming the regular windings. In order to block the electromagnetic noise in the radial direction, side shields 12A and 12B are provided on outer and inner peripheries of the stator core 2, respectively. The side shields 12A and 12B block the electromagnetic noise in the radial direction between the distribution pattern layer 13a in the multilayered printed board 1 and the windings 4.

Figure 5:
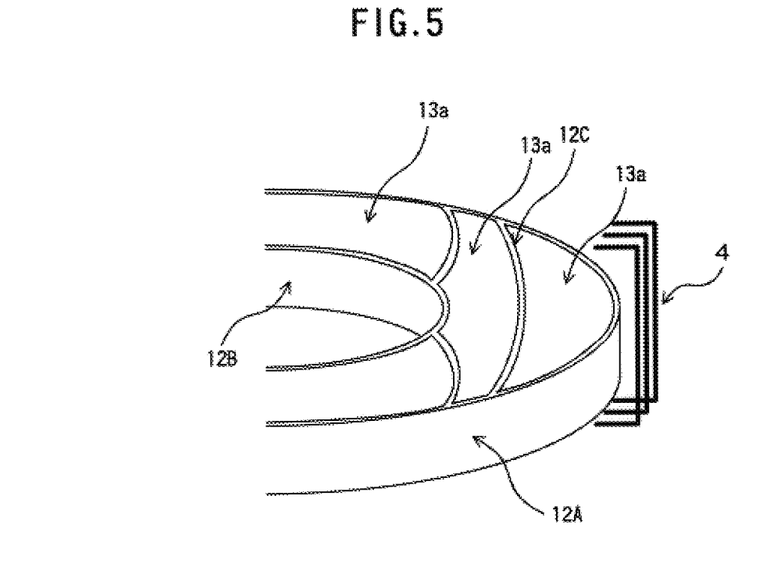
FIG. 5 is a partially perspective view of the stator having shields at abutments of blocks of a distribution pattern layer.

FIG. 5 shows a stator structure for shielding the electromagnetic noise between the distribution blocks in the distribution pattern layer in the multilayered printed board. In the case where the distribution pattern layer 13a comprises a plurality of distribution blocks, it is necessary to take the electromagnetic noise between the distribution blocks into account. In order to shield the electromagnetic noise between the distribution blocks, shields 12C for distribution blocks are provided at abutments between the distribution blocks.

The shields 12C for distribution blocks may be connected to the side shield 12A and/or the side shield 12B at the outer periphery and/or the inner periphery of the multilayered printed board 1 and may be electrically connected with the shield layers in the multilayered printed board 1 through a through hole.

An embodiment of the stator structure in which second windings are formed around the first windings will be described referring to FIGS. 6 and 7. Distribution winding may be applied to the way of winding wires. The distribution winding is to flow electric current in one phase in another phase to reduce the torque ripple.

Figure 6:
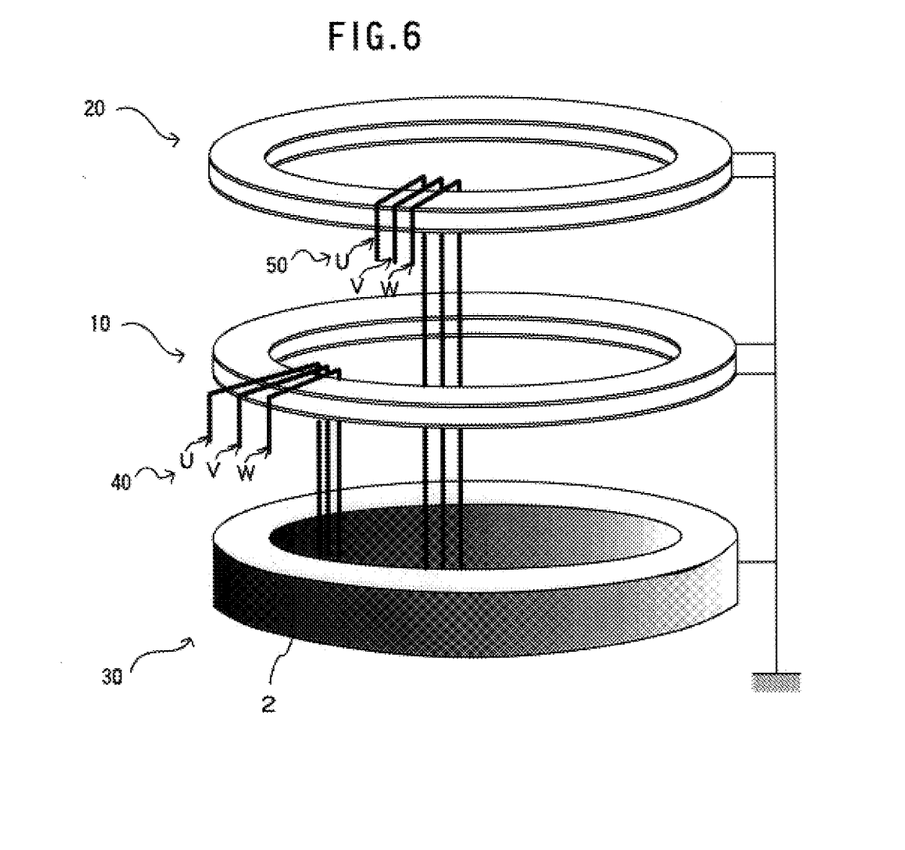
FIG. 6 is an exploded view of a stator according to another embodiment of the present invention.

In FIG. 6, a stator 30 comprises a first multilayered printed board 10, a second multilayered printed board 20 arranged on the first multilayered printed board 10, the slot-less stator core 2 having a shape of a toroid or a short cylindrical tube, and first and second layers of windings 40 an 50.

The first layer of windings 40 are formed around the first multilayered printed board 10 and the stator core 2 to enfold them toridally in a manner of regular winding, and the second layer of windings 50 are formed around the first and second multilayered printed boards 10 and 20 and the stator core 2 to enfold them toridally in a manner of regular winding. In FIG. 6, only a part of the first and second layers of windings 40 and 50 are schematically shown.

Figure 7:
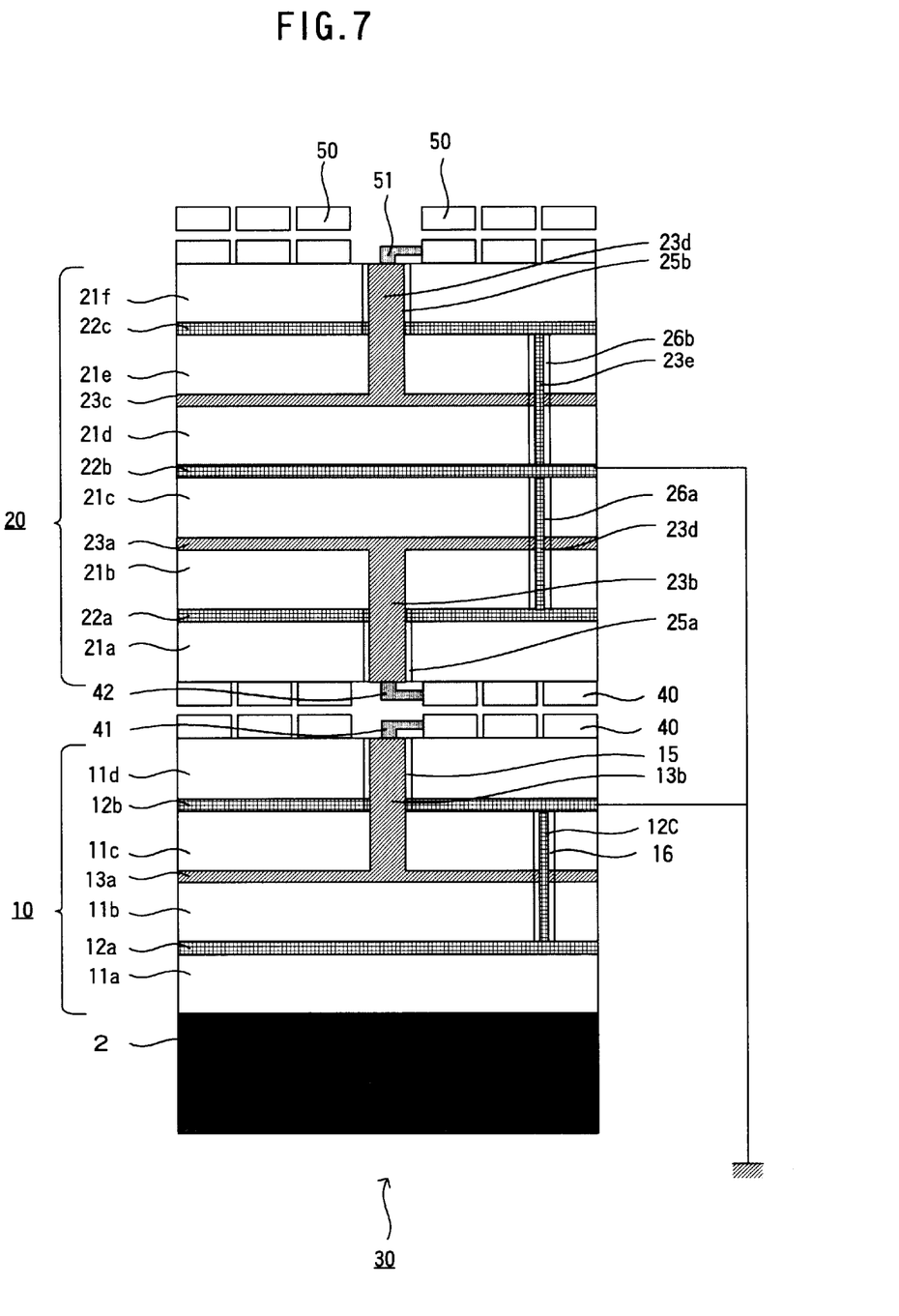
FIG. 7 is a partially sectional view of the stator as shown in FIG. 6.

The details of the first printed board 10 and the second printed board 20 are shown in FIG. 7. In FIG. 7, the first multilayered printed board 10 comprises a resin layer 11a, a shield layer 12a, a resin layer 11b, a distribution pattern layer 13a, a resin layer 11c, a shield layer 12b and a resin layer 11d laminated successively and the first layer of windings 40 are formed on the outer resin layer 11d, in the same manner as shown in FIG. 3. With this multilayered structure, the distribution pattern layer 13a is arranged between the shield layer 12a and the shield layer 12b.

The distribution pattern layer 13a is electrically connected with the windings 40 through the connecting member 41 and the connecting pattern 13b. The shield layers 12a and 12b are disposed with the distribution pattern layer 13a therebetween and connected with each other through the connection pattern 12c provided in the through hole 16 formed through the resin layers 11b, 11c and the distribution pattern layer 13a, to be connected to the ground together with the stator core 2.

The second multilayered printed board 20 is mounted on the first layer of windings 40 and the second layer of windings 50 is formed on the second multilayered printed board 20.

The second multilayered printed board 20 comprises a resin layer 21a, a shield layer 22a, a resin layer 21b, a distribution pattern layer 23a, a resin layer 21c, a shield layer 22b and a resin layer 21d, a distribution pattern layer 23c, a resin layer 21e, a shield layer 22c and a resin layer 21f laminated successively and the second layer of windings 50 are formed on the outermost resin layer 21f. With these multilayered structures, the distribution pattern layer 23a is arranged between the shield layer 22a and the shield layer 22b, and the distribution pattern layer 23c is arranged between the shield layer 22b and the shield layer 22c.

The distribution pattern layer 23a is for electrically connection between the winding segments of respective phases of the first layer of windings 40, and is connected to the first layer of windings 40 through a connecting member 42 and a connecting pattern 23b. The connecting pattern 23b has one end connected to the distribution pattern layer 33a and the other end exposed to an opening of the resin layer 21a through a through hole 25a pierced through the resin layer 21b, the shield layer 22a and the resin layer 21a. The connecting member 42 connects the connecting pattern 23b with the first layer of windings 40.

The distribution pattern layer 23c is for electrically connection between the winding segments of respective phases of the second layer of windings 50, and is connected to the second layer of windings 50 through a connecting member 51 and a connecting pattern 23d. The connecting pattern 23d has one end connected to the distribution pattern layer 23c and the other end exposed to an opening of the resin layer 21f through a through hole 25b pierced through the resin layer 21e, the shield layer 22c and the resin layer 21f. The connecting member 51 connects the connecting pattern 23d with the second layer of winding 50.

As stated above, the shield layers 12a and 12b are disposed with the distribution pattern layer 13a therebetween and connected with each other through the connection pattern 12c provided in the through hole 16 formed through the resin layers 11b, 11c and the distribution pattern layer 13a, to be connected to the ground together with the stator core 2. With this arrangement, the shield layers 12a and 12b prevent mutual invasion and exudation of electromagnetic noise between the distribution pattern layer 13a and the first layer of windings 40, the distribution pattern layers 23a and 23c, and the second layer of windings 50.

The shield layers 22a and 22b are disposed with the distribution pattern layer 23a therebetween and connected with each other through the connection pattern 23d provided in the through hole 26a formed through the resin layers 21b, 21c and the distribution pattern layer 23a, to be connected to the ground together with the stator core 2. The shield layers 22b and 22c are disposed with the distribution pattern layer 23c therebetween and connected with each other through the connection pattern 23e provided in the through hole 26b formed through the resin layers 21d, 21e and the distribution pattern layer 23c, to be connected to the ground together with the stator core 2.

With the above arrangement, the shield layers 22a, 22b and 22c prevent mutual invasion and exudation of electromagnetic noise among the distribution pattern layers 13a, 23a and 23c, the first layer of windings 40 and the second layer of windings 50.

The electrical connection between the shield layers 12a and the stator core 2 can be established by a through hole formed in the resin layer 11a inside the stator 3 for using a single lead line for grounding to simplify the distribution.

Figure 8:
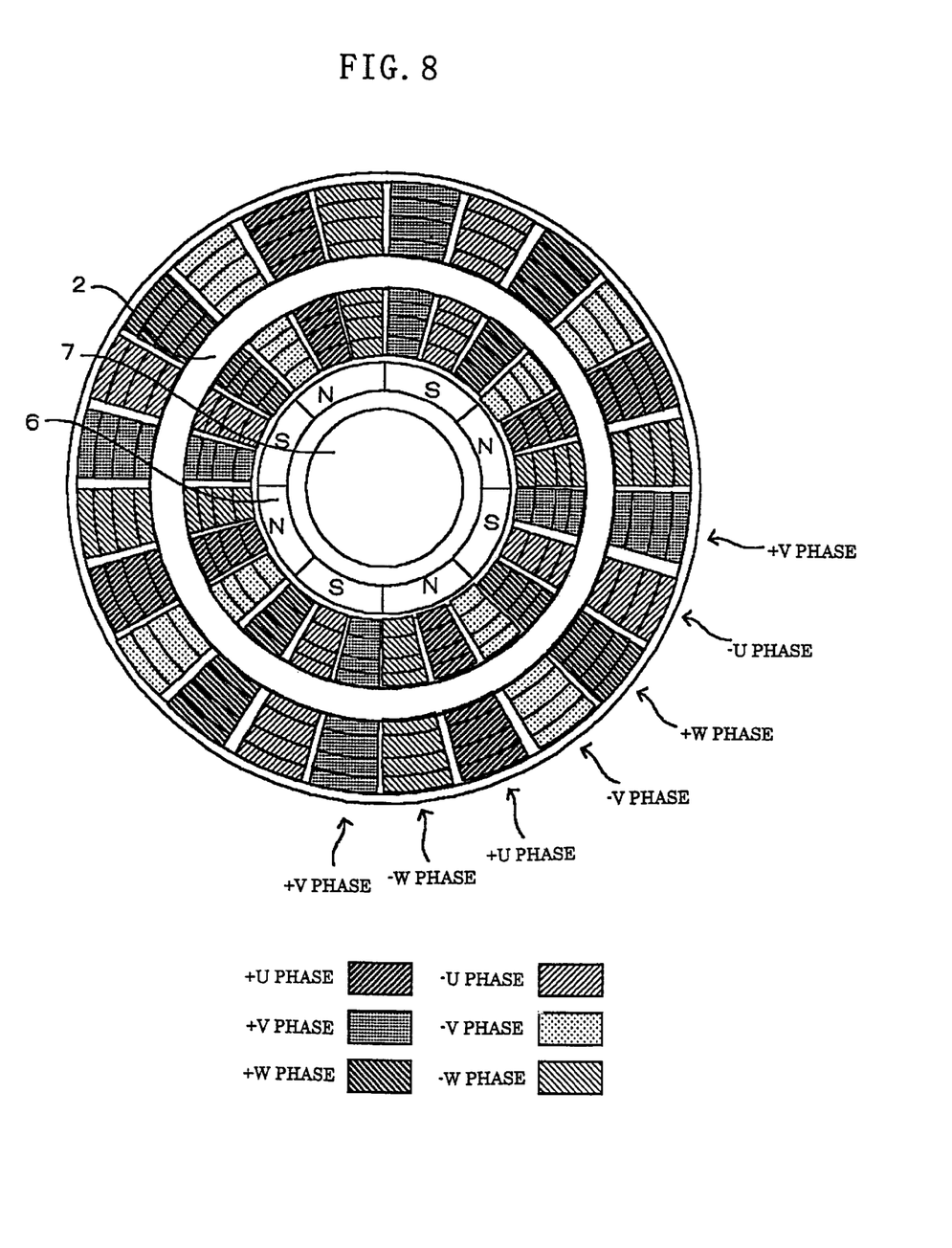
FIG. 8 is a schematic diagram for showing concentrated windings.
Figure 9:
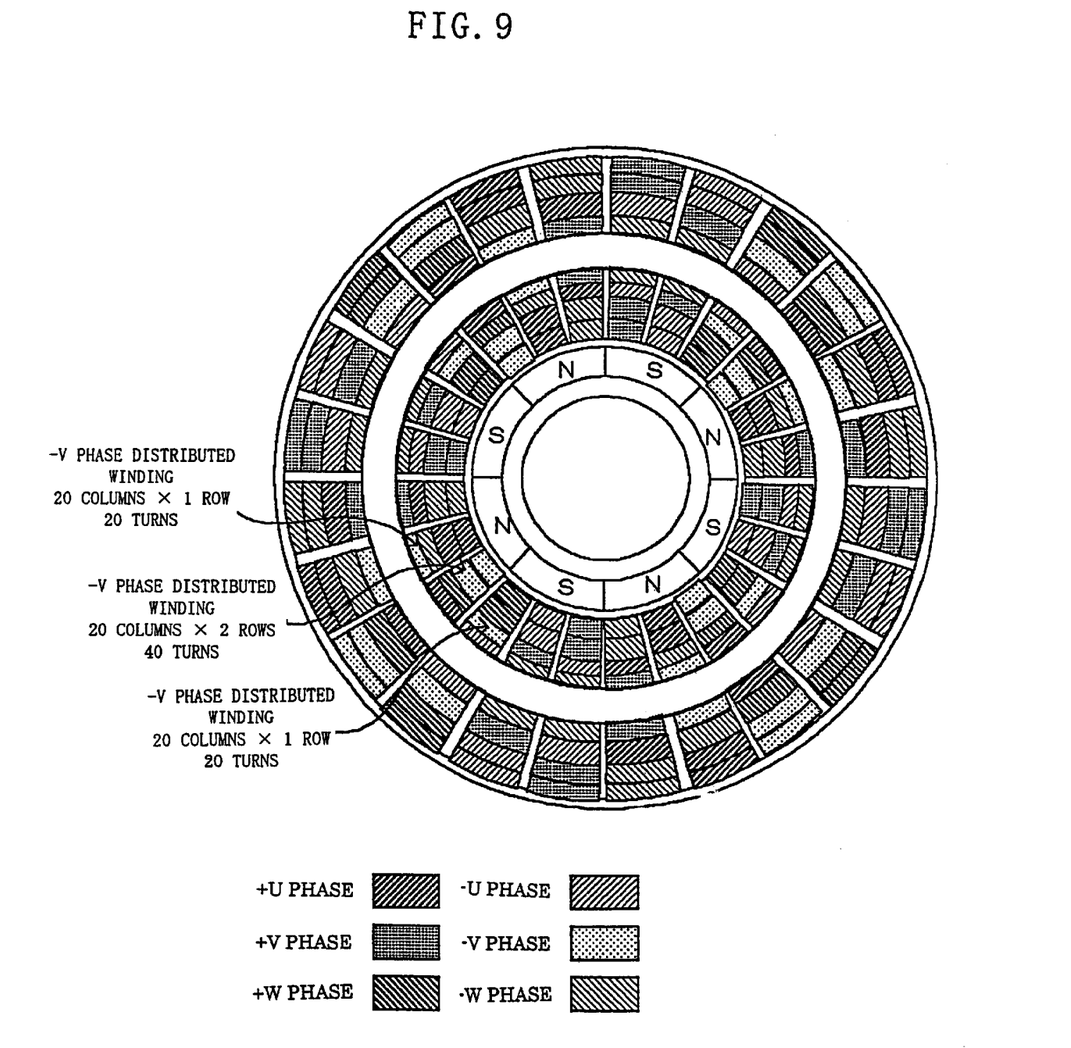
FIG. 9 is a schematic diagram for showing distributed windings.

FIGS. 8 and 9 are sectional view of a stator and a rotor for showing winding distribution in the case of a three-phase eight-pole AC servomotor in which eighty turns of toridal winding is formed for each phase of one pole. The winding segments of −U, −V and −W phases are wound in the direction opposites to the windings of +U, +V and +W phases.

FIG. 8 shows windings formed by concentrated winding in which the same phase of winding is formed in the same winding segment. Each winding segment is formed within an angular range of 15 degree and the total number of 24 segments (8 poles×3 phases) are formed around the stator core and the multilayered printed board. The segments of the same phase, which are arranged with two segments of different phases therebetween and wound in the opposite directions, are connected with one another via the distribution pattern layer of the printed board. The segments of each phase are sequentially fed with electric current to be energized, and the rotor is rotated by the electromagnetic force acting between the segments of each phase and magnets 6 provided on the rotor core 7. The stator of this concentrated winding is constituted by using one multilayered printed board, as shown in FIGS. 1 through 3.

FIG. 9 shows windings formed in a distributing winding manner in which a different phase of winding is formed in the same winding segment. Twenty, forty and twenty turns of the same phase winding are distributed to the adjacent three winding segments for one pole within an angular range of 45 degree. With this distributing winding, smoother rotation of the rotor is expected although torque is lowered a little. This distributing winding requires a plurality of multilayered printed boards for interconnection of the winding segments since different phase winding exists in the same winding segment.

In either example as shown in FIGS. 8 and 9, a rotor core 7 with magnets corresponding to poles of the stator is provided inside the stator.

As described, according to the stator structure of the present invention, a motor of high precision can be constituted by suppressing influence of electromagnetic noise between windings and a distribution pattern of a printed board.

What is claimed is:

1. A stator structure of a motor comprising:

a stator core;

a multilayered printed board arranged on an axial end face of said stator core; and windings formed around said stator core and said multilayered printed board toroidally in a regular winding manner to enfold said stator core and said multilayered printed board, wherein said multilayered printed board includes a distribution pattern layer to interconnect said windings, and a shield to shield electromagnetism between said distribution pattern layer and said windings in a region enfolded by said windings.

2. A stator structure according to claim 1, wherein said shield includes two shield layers arranged with said distribution pattern layer therebetween in an axial direction of the motor.

3. A stator structure according to claim 1, wherein said shield includes a side shield covering a radial periphery of said multilayered printed board.

4. A stator structure according to claim 1, wherein said distribution pattern layer comprises a plurality of distribution blocks and an additional shield for shielding electromagnetism is provided at abutment between adjacent ones of said distribution blocks.

5. A stator structure of a motor comprising:

a stator core;

a first multilayered printed board arranged on an axial end face of said stator core;

first windings formed around said stator core and said first multilayered printed board toroidally in a regular winding manner;

a second multilayered printed board arranged on an outermost surface of said first windings;

second windings formed around said stator core, said first multilayered printed board and said first windings toroidally in a regular winding manner, wherein said first multilayered printed board has a first distribution pattern layer to interconnect said first windings, and a first shield to shield electromagnetism between said first distribution pattern layer and said first windings, and said second multilayered printed board has a second distribution pattern layer to interconnect said second windings, and a second shield to shield electromagnetism between said second distribution pattern layer and said first and second windings.

6. A stator structure according to claim 5, wherein said second multilayered printed board has a third distribution pattern layer to interconnect said first windings, and a third shield to shield electromagnetism between said third distribution pattern layer and said first windings.

7. A stator structure according to claim 5, wherein said second shield includes two shield layers arranged with said second distribution pattern layer therebetween.

8. A stator structure according to claim 5, wherein said first and second shields include a side shield covering a radial periphery of said multilayered printed board.

9. A stator structure according to claim 5, wherein said distribution pattern layer comprises a plurality of distribution blocks and an additional shield is provided at abutment between adjacent ones of said distribution blocks.

* * * * *